United States Patent
Namazue et al.

(10) Patent No.: US 12,339,509 B2
(45) Date of Patent: Jun. 24, 2025

(54) CABLE AND CABLE REINFORCEMENT SHEET

(71) Applicant: Fujikura Ltd., Tokyo (JP)

(72) Inventors: Akira Namazue, Sakura (JP); Tomoaki Kaji, Sakura (JP); Ken Osato, Sakura (JP)

(73) Assignee: FUJIKURA LTD., Tokyo (JP)

( * ) Notice: Subject to any disclaimer, the term of this patent is extended or adjusted under 35 U.S.C. 154(b) by 16 days.

(21) Appl. No.: 18/403,963

(22) Filed: Jan. 4, 2024

(65) Prior Publication Data

US 2024/0134137 A1 Apr. 25, 2024

Related U.S. Application Data

(63) Continuation of application No. 17/763,271, filed as application No. PCT/JP2020/046635 on Dec. 15, 2020, now Pat. No. 11,899,259.

(30) Foreign Application Priority Data

Dec. 23, 2019 (JP) ................................. 2019-231737

(51) Int. Cl.
*G02B 6/44* (2006.01)
*H01B 7/17* (2006.01)

(52) U.S. Cl.
CPC ......... *G02B 6/4432* (2013.01); *G02B 6/4431* (2023.05); *G02B 6/4488* (2013.01); *H01B 7/17* (2013.01)

(58) Field of Classification Search
CPC .................. G02B 6/4429–4435; G02B 6/4488
See application file for complete search history.

(56) References Cited

U.S. PATENT DOCUMENTS 3,829,602 A 8/1974 Ishikawa et al.
4,555,054 A 11/1985 Winter et al.
(Continued)

FOREIGN PATENT DOCUMENTS

CH 615300 A5 * 1/1980
EP 0127042 A2 12/1984
(Continued)

OTHER PUBLICATIONS

International Search Report issued in corresponding International Application No. PCT/JP2020/046635, mailed on Mar. 9, 2021 (2 pages).

*Primary Examiner* — Charlie Y Peng
(74) *Attorney, Agent, or Firm* — Osha Bergman Watanabe & Burton LLP

(57) ABSTRACT

A cable that protects an object includes a sheath and a cylindrical reinforcement member disposed inside the sheath and that surrounds the object. The cylindrical reinforcement member has a first side edge and a second side edge that extend in a longitudinal direction. The cylindrical reinforcement member is formed of a cable reinforcement sheet including a first metal sheet and a second metal sheet joined to the first metal sheet. A portion of the first metal sheet overlaps a portion of the second metal sheet, and the overlapping portions define a joint portion where the first metal sheet and the second metal sheet are joined. The joint portion is inclined, from the second side edge to the first side edge, toward the first metal sheet.

12 Claims, 4 Drawing Sheets

(56) References Cited

U.S. PATENT DOCUMENTS

| | | | |
|---|---|---|---|
| 4,767,182 | A | 8/1988 | Parfree et al. |
| 4,993,805 | A | 2/1991 | Abe et al. |
| 5,191,911 | A | 3/1993 | Dubois |
| 2011/0286706 | A1 | 11/2011 | Greenwood, III et al. |
| 2015/0043874 | A1 | 2/2015 | Sandate Aguilar et al. |

FOREIGN PATENT DOCUMENTS

| | | | |
|---|---|---|---|
| JP | S52-120386 | A | 10/1977 |
| JP | 2001-006449 | A | 1/2001 |
| JP | 2017-072801 | A | 4/2017 |
| JP | 2019-113617 | A | 7/2019 |

\* cited by examiner

CABLE AND CABLE REINFORCEMENT SHEET

CROSS-REFERENCE TO RELATED APPLICATIONS

The present application is a continuation application of U.S. patent application Ser. No. 17/763,271 filed Mar. 24, 2022, which is a national stage application of International Application No. PCT/JP2020/046635, filed Dec. 15, 2020, which claims priority to Japanese Patent Application No. 2019-231737 filed in Japan on Dec. 23, 2019. The contents of these applications are incorporated herein by reference in their entirety.

BACKGROUND

Technical Field

The present disclosure relates to a cable and a cable reinforcement sheet.

Description of Related Art

In cables such as optical fiber cables, a metal reinforcement member may be used to protect the object to be protected housed in a sheath. For example, the cable of Patent Document 1 includes a sheath, a cable main body housed in the sheath, and a reinforcement member surrounding the cable main body inside the sheath. The configuration prevents the cable main body, which is the object to be protected, from being bitten by a mouse, squirrel, or the like, and damaging the optical fiber. The reinforcement member is generally formed by rolling up a metal sheet as a material.

PATENT DOCUMENT

[Patent Document 1] Japanese Patent Application, First Publication No. 2019-113617

If the length of the cable is long, a plurality of metal sheets used as a material for the reinforcement member may be spliced together. Here, since the metal sheets are overlapped at a seam portion (joint portion) between the metal sheets, a step is generated depending on the thickness of the metal sheet itself. As described above, the sheath may be cracked due to the step caused by the thickness of the metal sheet itself at the joint portion.

The present invention has been made in consideration of such circumstances, and provides a cable or a cable reinforcement sheet capable of suppressing cracking in the sheath.

SUMMARY

According to one or more embodiments of the present application, a cable includes a sheath, a cylindrical reinforcement member disposed inside the sheath, and an object to be protected disposed inside the reinforcement member, where the reinforcement member is formed by rolling up a cable reinforcement sheet including a first metal sheet and a second metal sheet joined to each other in a state in which the first metal sheet and the second metal sheet overlap with each other at a joint portion in a width direction of the cable reinforcement sheet, the cable reinforcement sheet includes a first side edge and a second side edge extending in a longitudinal direction, the joint portion is inclined so as to go toward the first metal sheet as the joint portion goes from the second side edge toward the first side edge, and when a point included in the joint portion, located on the first side edge, and located closest to the second metal sheet in the first metal sheet is defined as a first point, and when a point included in the joint portion, located on the second side edge, and located closest to the first metal sheet in the second metal sheet is defined as a second point, the first point is located closer to the first metal sheet than the second point.

According to one or more embodiments of the present application, a cable reinforcement sheet protects an object to be protected by surrounding the object to be protected, the cable reinforcement sheet including a first metal sheet and a second metal sheet joined to each other in a state where the first metal sheet and the second metal sheet overlap with each other at a joint portion, in which the cable reinforcement sheet comprises a first side edge and a second side edge extending in a longitudinal direction, the joint portion is inclined so as to go toward the first metal sheet as the joint portion goes from the second side edge toward the first side edge, and when a point included in the joint portion, located on the first side edge, and located closest to the second metal sheet in the first metal sheet is defined as a first point, and when a point included in the joint portion, located on the second side edge, and located closest to the first metal sheet in the second metal sheet is defined as a second point, the first point is located closer to the first metal sheet than the second point.

According to one or more embodiments of the present invention described above, it is possible to provide a cable or a cable reinforcement sheet capable of suppressing cracking in the sheath.

BRIEF DESCRIPTIONS OF THE DRAWINGS

DETAILED DESCRIPTION

First Example

Hereinafter, the configuration of the cable according to one or more embodiments will be described with reference to the drawings.

Figure 1:
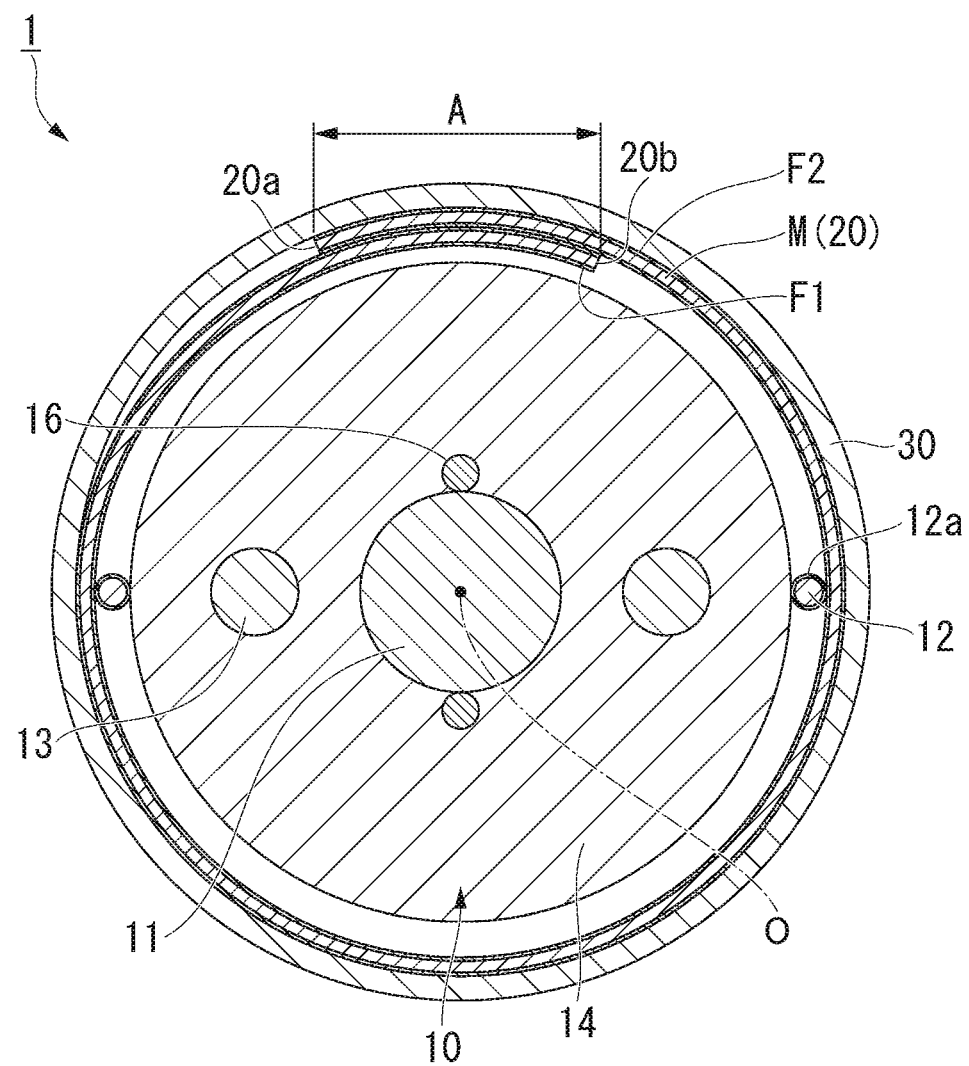
FIG. 1 is a transverse cross-sectional view of the cable according to one or more embodiments.

As shown in FIG. 1, a cable 1 includes a cable main body 10 having an optical fiber, a reinforcement member M, and a sheath 30. The reinforcement member M protects the optical fiber of the cable main body 10. That is, in one or more embodiments, the objects to be protected are the cable main body 10 and the optical fiber, and the cable 1 is the optical fiber cable.

(Direction Definition)

Here, in one or more embodiments, a longitudinal direction of the cable 1 is simply referred to as a longitudinal direction, and a central axis of the cable 1 is simply referred to as a central axis O. In addition, in a cross-sectional view, a direction that intersects the central axis O is referred to as a radial direction, and a direction that orbits around the central axis O is referred to as a circumferential direction.

The cable main body 10 includes a core 11, an internal sheath 14, and a pair of tensile strength bodies (tension members) 13.

The core 11 extends in the longitudinal direction. The core 11 is constituted by assembling a plurality of optical fibers. As the optical fiber constituting the core 11, an optical fiber element wire, an optical fiber core wire, an optical fiber tape core wire, or the like can be used. The plurality of optical fibers constituting the core 11 are bound by a binding material in a bundled state, for example. The plurality of optical fibers may be covered with a presser roll or a water-absorbing tape (sheet). The transverse cross-sectional shape of the core 11 is not particularly limited, and may be circular, elliptical, or rectangular.

The inner sheath 14 collectively covers the core 11, the pair of tensile strength bodies 13, and a pair of inner ripcords 16. As the material of the inner sheath 14, a resin such as polyethylene (PE) or polyvinyl chloride (PVC) can be used. The inner ripcord 16 is used when the inner sheath 14 is torn to remove the core 11.

A pair of outer ripcords 12 are arranged in the gap between the inner sheath 14 and the reinforcement member M. The pair of outer ripcords 12 are used during the operation of tearing the reinforcement member M and the sheath 30 (hereinafter, simply referred to as tearing operation). As the outer ripcord 12, a string made of synthetic fibers such as polyester and aramid can be used. An adhesive layer 12a may be coated around the outer ripcord 12.

The tensile strength body 13 extends in the longitudinal direction. The tensile strength body 13 may be arranged parallel to the core 11 in the longitudinal direction, or may be arranged in a spiral shape centered on the core 11. The tensile strength body 13 protects the optical fiber of the core 11 from the tension acting on the cable 1. The material of the tensile strength body 13 is, for example, a metal wire (steel wire or the like), a tensile strength fiber (aramid fiber or the like), FRP, or the like. The tensile strength body 13 may be a single wire, or may be a stranded wire obtained by bundling a plurality of strands or twisting them together.

The cable main body 10 may include three or more tensile strength bodies 13.

When three or more tensile strength bodies 13 are arranged at equal intervals in the circumferential direction, the dependence of the bending direction of the cable main body 10 is reduced, and the cable 1 can be handled more easily.

The sheath 30 houses the cable main body 10 and the reinforcement member M. The sheath 30 is formed in a cylindrical shape extending in the longitudinal direction. As the material of the sheath 30, a resin such as polyethylene (PE) or polyvinyl chloride (PVC) can be used. In addition, the sheath 30 may include a small molecule component such as a small molecule siloxane as a flame retardant.

The reinforcement member M extends in the longitudinal direction and is formed in a cylindrical shape surrounding the cable main body 10. A first adhesive film F1 and a second adhesive film F2 are provided on both surfaces of the reinforcement member M. A corrugated shape may be formed on the reinforcement member M.

As the material of the reinforcement member M, a metal such as iron, stainless steel, copper, a copper alloy, or aluminum can be used.

The reinforcement member M surrounds the cable main body 10 over the entire circumference and is overlapped in a portion in the circumferential direction. The portion where the reinforcement members M are overlapped in the circumferential direction is referred to as an overlapping portion A.

The first adhesive film F1 is attached and fixed to the surface of the reinforcement member M facing the cable main body 10. The second adhesive film F2 is attached and fixed to the surface of the reinforcement member M facing the sheath 30. The first adhesive film F1 fixes the outer ripcord 12 to the reinforcement member M. The second adhesive film F2 fixes the sheath 30 to the reinforcement member M. In addition, in the portion of the first adhesive film F1 and the second adhesive film F2 that is located between the reinforcement members M in the overlapping portion A, the reinforcement members M are fixed to each other by the overlapping portion A.

As the adhesive used for the first adhesive film F1 and the second adhesive film F2, for example, a thermosetting adhesive can be used. The materials of the adhesive films F1 and F2 can be changed as appropriate. In addition, the adhesive films F1 and F2 may have a two-layer structure. In particular, in the second adhesive film F2, the layer to be adhered to the reinforcement member M may be formed of a material suitable for adhesion to metal, and the layer to be adhered to the sheath 30 may be formed of a material suitable for adhesion to resin.

Furthermore, if the position of the outer ripcord 12 can be fixed by another member and method, it is not necessary to provide the first adhesive film F1. Even if the first adhesive film F1 is provided, it does not have to be for fixing the outer ripcord 12. If the sheath is made of a material that easily adheres to the reinforcement member, the second adhesive film F2 may not be provided. Instead, an adhesive may be applied or welded to a portion of or the entirety of the overlapping portion A in order to bond the reinforcement members M to each other in the overlapping portion A.

Next, a method of manufacturing the reinforcement member M will be described with reference to Parts (a)-(c) of FIG. 2.

Figure 2:
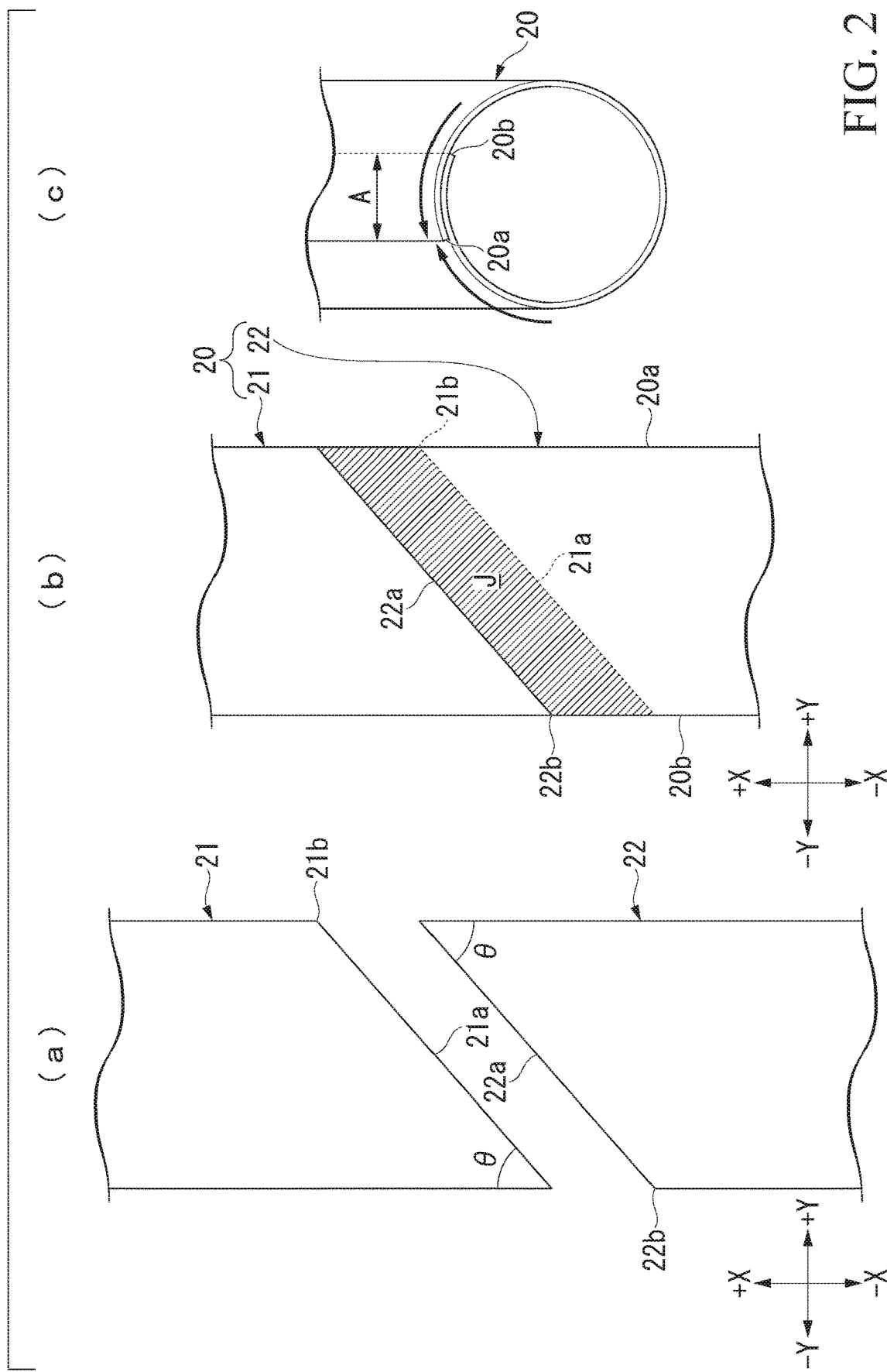
FIG. 2 is an explanatory diagram of the cable reinforcement sheet according to one or more embodiments.

In Parts (a) and (b) of FIG. 2, the X-axis indicates the longitudinal direction, and the Y-axis indicates the direction orthogonal to the longitudinal direction. Hereinafter, the X-axis direction is referred to as a longitudinal direction X, and the Y-axis direction is referred to as an orthogonal direction Y. The first metal sheet 21 side in the longitudinal direction X is referred to as a +X side, and the second metal sheet 22 side is referred to as a −X side. In addition, one side in the orthogonal direction Y is referred to as a +Y side, and the other side is referred to as a −Y side.

When manufacturing the reinforcement member M, first, a plurality of metal sheets to be the reinforcement member M are prepared. The thickness of the metal sheet is, for example, approximately 0.1 to 0.3 mm. By setting the thickness of the metal sheet within such a range, it is possible to prevent the optical fiber of the core 11 from being damaged by animals, and to facilitate the operation of tearing the reinforcement member M by the outer ripcord 12.

In Part (a) of FIG. 2, the first metal sheet 21 and the second metal sheet 22 are described. However, three or more metal sheets may be prepared depending on the length of the cable 1. The first metal sheet 21 includes an edge 21a, and the second metal sheet 22 includes an edge 22a. The edges 21a and 22a are inclined toward the +X side as they advance toward the +Y side. The edges 21a and 22a form a predetermined angle θ with respect to the orthogonal direction Y. The angle θ is an acute angle. In particular, the angle θ may be 40° or more and 60° or less. When preparing the metal sheets 21 and 22, it may cut the end portions of the metal sheets 21 and 22 in the longitudinal direction X so that such edges 21a and 22a are formed.

Next, as shown in Part (b) of FIG. 2, the first metal sheet 21 and the second metal sheet 22 are overlapped with each other. In the present specification, the portion where the first metal sheet 21 and the second metal sheet 22 overlap is referred to as a joint portion J. In the example of Part (b) of FIG. 2, the joint portion J has a parallel quadrilateral shape. The joint portion J is inclined toward the +Y side with respect to the orthogonal direction Y as it advances toward the +X side. Such inclination is based on the shape of the edges 21a and 22a. The distance between the edge 21a and the edge 22a in the longitudinal direction X, that is, the width of the joint portion J in the longitudinal direction X is constant over the entire area of the orthogonal direction Y.

By joining the first metal sheet 21 and the second metal sheet 22 at the joint portion J, one cable reinforcement sheet 20 can be obtained. The cable reinforcement sheet 20 includes a first side edge 20a and a second side edge 20b extending along the longitudinal direction X. The first side edge 20a is located on the +Y side, and the second side edge 20b is located on the -Y side. In the reinforcement member M, the first side edge 20a is located radially outside the second side edge 20b and is in contact with the sheath 30 (see FIG. 1).

As a fixing method in the joint portion J, welding, adhesion or the like can be used. When the first metal sheet 21 and the second metal sheet 22 are fixed by adhesion, the first adhesive film F1 or the second adhesive film F2 may be provided in advance on the metal sheets 21 and 22, and these adhesive films may be used for adhesion and fixation.

In the case of fixation by welding, when the first adhesive film F1 or the second adhesive film F2 may be provided on the metal sheets 21 and 22 in advance, the adhesive film of the portion to be welded (joint portion J) may be removed and then may be welded. In addition, after the above, the adhesive film may be reattached to the portion (joint portion J or the like) from which the adhesive films F1 and F2 have been removed. In this case, the joint portion J can be reinforced by the adhesive film, and cracks or the like can be suppressed from occurring in the joint portion J.

Next, as shown in Part (c) of FIG. 2, the cable reinforcement sheet 20 is rolled up in the width direction thereof. As a result, both end portions of the cable reinforcement sheet 20 in the circumferential direction overlap to form the overlapping portion A. In the overlapping portion A, both end portions of the cable reinforcement sheet 20 in the circumferential direction are adhesively fixed by the first adhesive film F1 or the second adhesive film F2. As a result, a cylindrical reinforcement member M is obtained.

Figure 3:
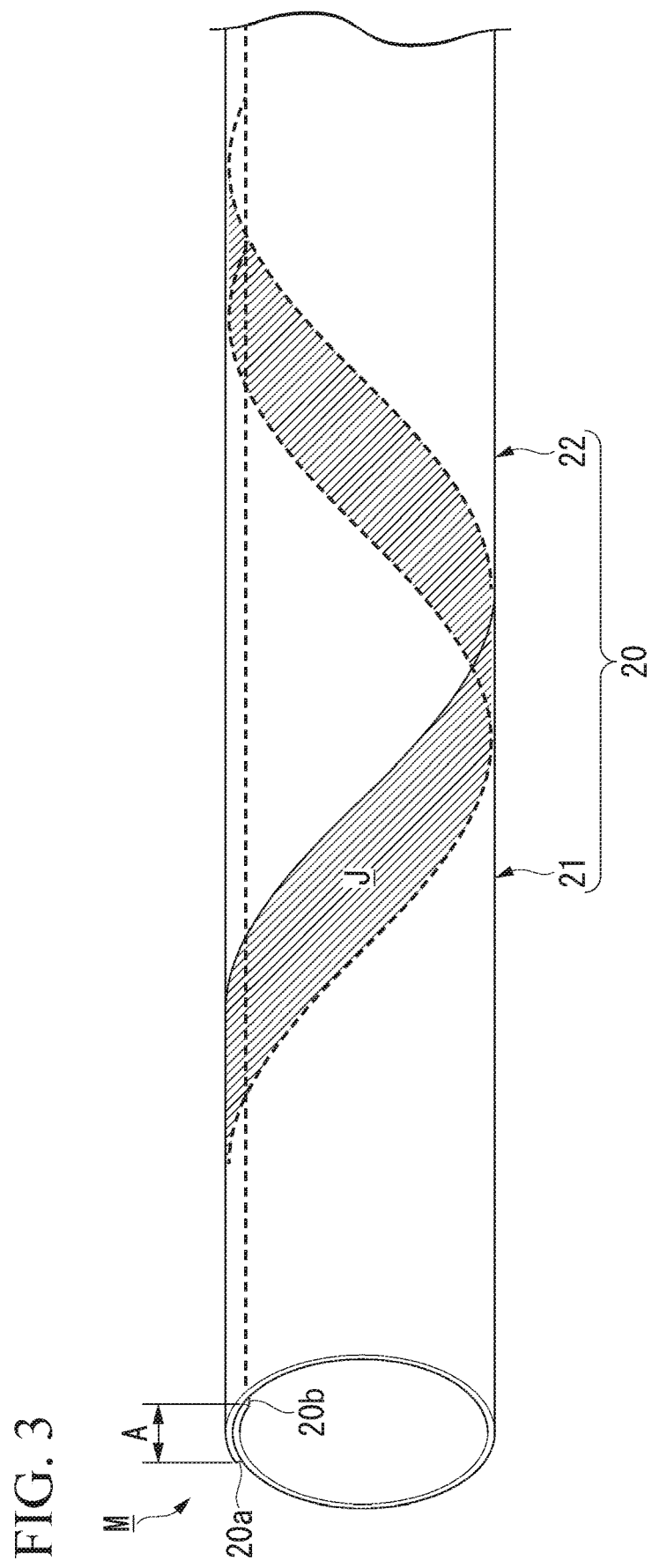
FIG. 3 is a diagram showing a position of a joint portion of a reinforcement member of FIG. 1.

As shown in FIG. 3, the reinforcement member M obtained as such has an overlapping portion A and a joint portion J. In the overlapping portion A, since the cable reinforcement sheets 20 overlap each other, the thickness of the reinforcement member M is twice the thickness of the cable reinforcement sheet 20. Also in the joint portion J, the thickness of the reinforcement member M is the sum of the thickness of the first metal sheet 21 and the thickness of the second metal sheet 22.

Here, in the overlapping portion A, when the joint portions J overlap each other, the thickness of the portions is four times or more the thickness of the metal sheets 21 and 22. As described above, when the reinforcement member M has a portion having an extremely large thickness, a large step is created in the portion, and local stress is likely to be applied to the sheath 30. When a local stress acts on the sheath 30, cracks or the like are likely to be occurred in the sheath 30.

Therefore, as shown in FIG. 3, the reinforcement member M of one or more embodiments is configured so that the joint portions J do not overlap each other in the overlapping portion A. In particular, as shown in Part (b) in FIG. 2, the point located on the first side edge 20a of the first metal sheet 21 and located closest to the -X side is defined as a first point 21b. In addition, the point of the second metal sheet 22 located on the second side edge 20b and located closest to the +X side is defined as a second point 22b. At this time, the first point 21b is located on the +X side of the second point 22b. According to such a configuration, when the cable reinforcement sheet 20 is rolled up in the width direction thereof, the end portions of the joint portion J in the circumferential direction are separated from each other in the longitudinal direction X. Therefore, it is possible to prevent the joint portions J from overlapping each other in the overlapping portion A, and it is possible to suppress the action of local stress on the sheath 30.

As described above, the cable of one or more embodiments includes the sheath 30, the cylindrical reinforcement member M arranged inside the sheath 30, and the object to be protected (cable main body 10) arranged inside the reinforcement member M. The reinforcement member M is formed by rolling up a cable reinforcement sheet 20 including a first metal sheet 21 and a second metal sheet 22 joined in a state of being overlapped with each other at a joint portion J in the width direction thereof, and the cable reinforcement sheet 20 includes the first side edge 20a and the second side edge 20b extending in the longitudinal direction X. The joint portion J is inclined toward the first metal sheet 21 as it advances from the second side edge 20b toward the first side edge 20a.

The point included in the joint portion J, located on the first side edge 20a, and located closest on the second metal sheet 22 side (-X side) of the first metal sheet 21 is defined as the first point 21b, and the point included in the joint portion J, located on the second side edge 20b, and located closest on the first metal sheet 21 side (+X side) of the second metal sheet 22 is defined as the second point 22b. At this time, the first point 21b is located closer to the first metal sheet 21 side (+X side) than the second point 22b. With such a configuration, it is possible to suppress the action of local stress on the sheath 30.

In addition, the cable reinforcement sheet 20 of one or more embodiments is a cable reinforcement sheet that protects an object to be protected by surrounding the object to be protected, includes a first metal sheet 21 and a second metal sheet 22 joined in a state of being overlapped with each other at the joint portion J, and includes the first side edge 20a and the second side edge 20b extending in the longitudinal direction X. The joint portion J is inclined toward the first metal sheet 21 as it advances from the second side edge 20b toward the first side edge 20a. The first point 21b of the cable reinforcement sheet 20 is located closer to the first metal sheet 21 side than the second point 22b. With such a cable reinforcement sheet 20, it is possible to form a reinforcement member M capable of suppressing cracks of the sheath 30 as described above.

In one or more embodiments, the edge 21a of the first metal sheet 21 and the edge 22a of the second metal sheet 22 are linear; however, the shape thereof may be curved or uneven. In addition, the edge 21a of the first metal sheet 21 and the edge 22a of the second metal sheet 22 do not have to be parallel to each other. Nonetheless, from the viewpoint of the reliability of fixation in the joint portion J, the edges 21a and 22a may be substantially linear, and the edge 21a and the edge 22a may be in parallel.

Second Example

Next, the second example according to the present disclosure will be described; however, the basic configuration is the same as that of the first example. Therefore, the same reference numerals are provided to the same configurations, the descriptions thereof will be omitted, and only the differences will be described.

In one or more embodiments, the shapes of the first metal sheet 21, the second metal sheet 22, and the joint portion J are different from those of the first example.

Figure 4:
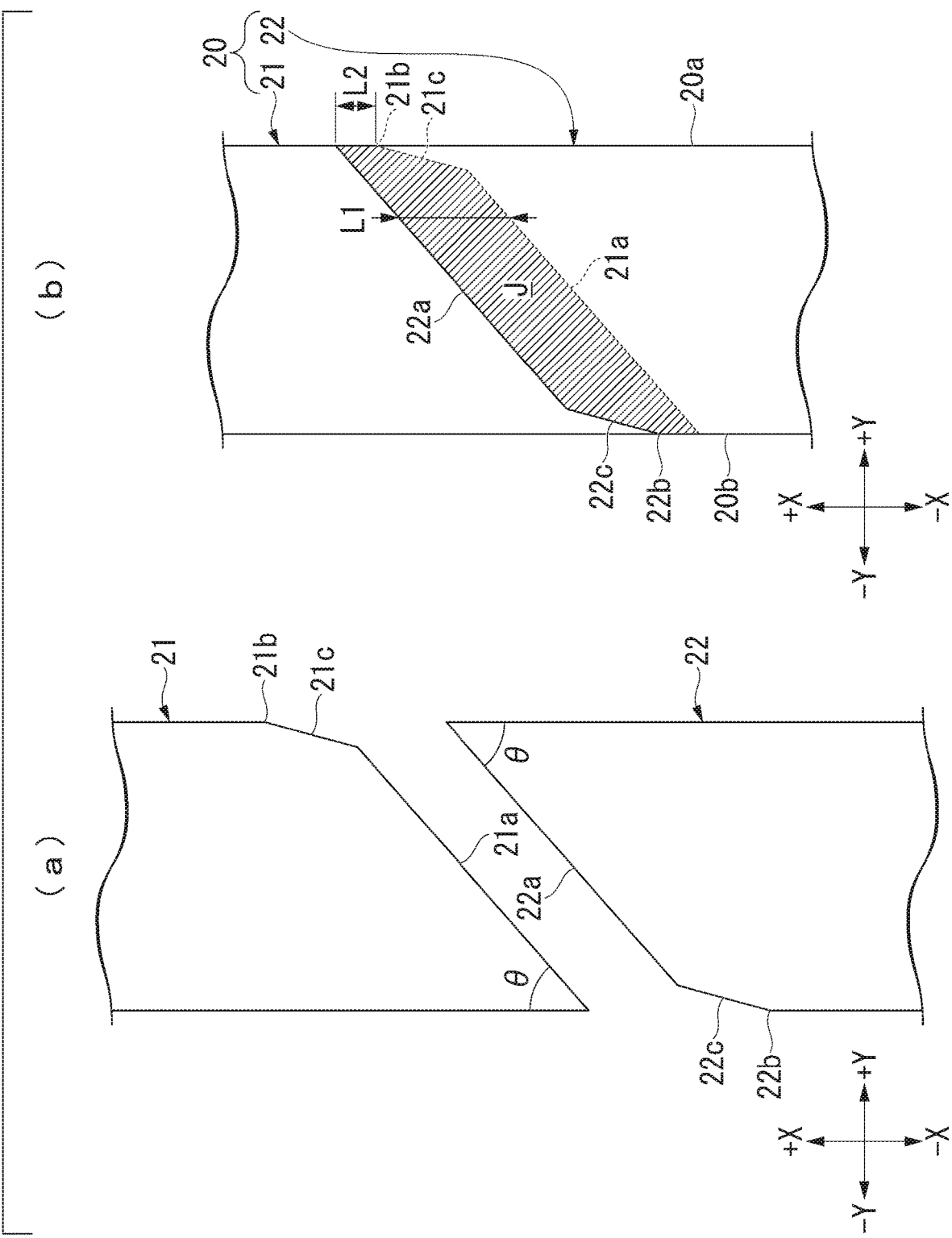
FIG. 4 is an explanatory diagram of a cable reinforcement sheet according to one or more embodiments.

As shown in Part (a) of FIG. 4, the first metal sheet 21 of one or more embodiments is formed with a first cutout portion 21c, and the second metal sheet 22 is formed with a second cutout portion 22c.

The first cutout portion 21c is formed at an end portion of the +Y side of the edge 21a of the first metal sheet 21. That is, the first cutout portion 21c is provided so as to cut off the obtuse angle portion formed by the edge 21a and the first side edge 20a of the first metal sheet 21. The second cutout portion 22c is formed at the end on the −Y side of the edge 22a of the second metal sheet 22. That is, the second cutout portion 22c is provided so as to cut off the obtuse angle portion formed by the edge 22a and the second side edge 20b of the second metal sheet 22.

The side edge on the +Y side of the first metal sheet 21 is shorter than the side edge on the −Y side, and the first cutout portion 21c is formed on the side edge on the +Y side. The side edge on the −Y side of the second metal sheet 22 is shorter than the side edge on the +Y side, and the second cutout portion 22c is formed on the side edge on the −Y side. In such a manner, the first cutout portion 21c and the second cutout portion 22c are formed on the shorter side edge of the two side edges of the first metal sheet 21 and the second metal sheet 22, respectively.

Since the cutout portions 21c and 22c are formed, the width of the joint portion J in the longitudinal direction X is non-uniform in the orthogonal direction Y. In particular, the size in the longitudinal direction X of the joint portion J in the portion where the cutout portions 21c and 22c are not formed is set as L1, and the size in the longitudinal direction X of the joint portion J in the first side edge 20a and the second side edge 20b is set as L2. At this time, L2<L1. In addition, in the portion where the cutout portions 21c and 22c are formed, the size of the joint portion J in the longitudinal direction X becomes smaller toward the outside in the orthogonal direction Y. Although the drawings show the cutout portions having a shape in which the obtuse angle portion is cut off in a straight line, the shape may have a convex curve toward the outside of the corner.

Also, in the case of one or more embodiments, as in the first example, it is possible to prevent the joint portions J from overlapping each other in the overlapping portion A, and it is possible to suppress the action of local stress on the sheath 30.

In addition, in one or more embodiments, the size L2 in the longitudinal direction X of the joint portion J at the first side edge 20a is smaller than the size L1 in the longitudinal direction X of the joint portion J at the portion away from the first side edge 20a. The first side edge 20a is a portion in contact with the sheath 30, and is a portion on which a local stress is applied to the sheath 30 when a step is formed. By reducing the size L2 of the joint portion J on the first side edge 20a, the possibility of cracks or the like occurring in the sheath 30 can be reduced. In addition, by increasing the size L1 of the joint portion J at a portion distant from the first side edge 20a, the area of the joint portion J can be increased to increase the joint strength.

Since the second side edge 20b does not contact the sheath 30 in the one or more embodiments, the size of the joint portion J in the second side edge 20b may be the same as that of L1. That is, the cutout portion 22c may not be formed on the second metal sheet 22. Nonetheless, by forming the cutout portion 22c also in the second metal sheet 22, the shapes of the first metal sheet 21 and the second metal sheet 22 can be the same, which is advantageous from the viewpoint of manufacturing efficiency.

EXAMPLES

Hereinafter, one or more embodiments described above will be described with reference to specific examples, although the present disclosure is not limited to the following examples.

In order to evaluate the shape of the joint portion J, cables 1 of Examples 1 to 4 and Comparative Examples 1 to 6 shown in Table 1 below were prepared.

TABLE 1

|  | EXAMPLE 1 | EXAMPLE 2 | EXAMPLE 3 | EXAMPLE 4 | COMPARATIVE EXAMPLE 1 |
| --- | --- | --- | --- | --- | --- |
| ANGLE θ (°) | 50 | 50 | 40 | 60 | 50 |
| TAPE WIDTH W (mm) | 64 | 64 | 64 | 64 | 64 |
| L1 (mm) | 12 | 12 | 12 | 12 | 5 |
| L2 (mm) | 5 | 2 | 5 | 5 | 5 |
| AREA S (mm$^2$) | 730 | 691 | 737 | 726 | 320 |
| S/W | 11.4 | 10.8 | 11.5 | 11.3 | 5.0 |
| PEELING AT JOINT PORTION | OK | OK | OK | OK | NG |
| CRACKING OF SHEATH | 0/10 | 0/10 | 0/10 | 0/10 | — |

|  | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
| --- | --- | --- | --- | --- | --- |
| ANGLE θ (°) | 50 | 50 | 90 | 90 | 50 |
| TAPE WIDTH W (mm) | 64 | 64 | 64 | 64 | 64 |
| L1 (mm) | 10 | 20 | 5 | 10 | 15 |
| L2 (mm) | 10 | 20 | 5 | 10 | 10 |
| AREA S (mm$^2$) | 640 | 1280 | 320 | 640 | 941 |
| S/W | 10.0 | 20.0 | 5.0 | 10.0 | 14.7 |

TABLE 1-continued

| PEELING AT JOINT PORTION | OK | OK | NG | OK | OK |
|---|---|---|---|---|---|
| CRACKING OF SHEATH | 8/10 | 9/10 | — | 4/10 | 3/10 |

The tape width W shown in Table 1 is the width of the cable reinforcement sheet 20 in the orthogonal direction Y. The angle θ, the size L1, and the size L2 are as described in the embodiments described above. The area S is the area of the joint portion J. S/W is a value obtained by dividing the area S by the tape width W. For each example and each comparative example, the material of the metal sheet 21 or the like to be the reinforcement member M (cable reinforcement sheet 20) is iron. The material of the sheath 30 is a flame-retardant resin. At the joint portion J, the metal sheet 21 and the like were joined by welding.

Under the conditions of each example and each comparative example, the cable 1 was manufactured so that the joint portions J were included at 10 points in each cable. That is, a cable reinforcement sheet 20 in which eleven metal sheets are joined was used. In Comparative Example 1 and Comparative Example 4, since the joint strength at the joint portion J was low, peeling occurred at the joint portion J. Therefore, the cable 1 could not be manufactured. Each of the other cables was wrapped around a mandrel whose diameter was 30 times the outer diameter of the cable, and left at 70° C. for 3 days. After that, the result of confirming the presence or absence of cracks in the sheath 30 is shown in the column of "cracking of sheath" in Table 1. For example, in Example 1, the sheath 30 did not crack at any of the ten joint portions J. In addition, in Comparative Example 2, the sheath 30 was cracked at eight of the ten joint portions J.

In Examples 1 to 4 of Table 1, peeling did not occur at the joint portion J, and cracks of the sheath 30 did not occur. On the other hand, in Comparative Examples 1 to 6, peeling occurred at the joint portion J, or the sheath 30 was cracked. Considering the difference between Examples 1 to 4 and Comparative Examples 1 to 6, L2 of Examples 1 to 4 is 5 mm or less, and L2 of Comparative Examples 1 to 6 is 5 mm or more. Since there was no sample in which the sheath 30 was cracked under the condition that L2 was 5 mm or less, it is considered that the cracking in the sheath 30 can be suppressed by setting L2 to 5 mm or less. The reason could be that by setting L2 to 5 mm or less, the range in which a large step is formed on the first side edge 20a of the reinforcement member M is reduced, and the occurrence of cracks in the sheath 30 is suppressed.

In addition, in Comparative Examples 1 and 4, it is considered that the size L1 and the area S were too small to secure the joint strength of the joint portion J, and the joint portion J was peeled off. It is considered that the joint strength of the joint portion J increases as the area S increases. In the case of welding and fixing at the joint portion J as in Examples 1 to 4 and Comparative Examples 1 to 6, if the value of the area S was 640 mm² or more, the joint portion J was not peeled off; therefore, the area S may be 640 mm² or more. In addition, the value obtained by dividing the area S by the tape width W represents the average bonding area of the joint portion J over the entire tape width W. When generalized using the average joint area, in Examples 1 to 4 and Comparative Examples 1 to 6, when the S/W value was 10.0 or more, the joint portion J was not peeled off; therefore, the S/W value may be 10.0 or more.

In addition, in Examples 1 to 4, θ is 40° or more and 60° or less. At least for samples in such a range, favorable results were obtained regarding cracks of the jacket 30.

The technical scope of the present disclosure is not limited to the above-described embodiments, and various modifications can be made without departing from the spirit of the present disclosure.

For example, the type of the object to be protected and the type of the cable 1 can be changed as appropriate. In particular, the object to be protected 10 may be an electric wire, and the cable 1 may be a power cable.

In addition, in the second example, the cutout portions 21c and 22c were formed on the shorter side edge of the first metal sheet 21 and the shorter side edge of the second metal sheet 22, respectively. Not limited to this, a cutout portion may be formed on at least one of the shorter side edges of the first metal sheet 21 and the second metal sheet 22.

In addition, it is possible to replace the constituent elements in the above-described embodiments with well-known constituent elements as appropriate without departing from the spirit of the present disclosure, and the above-described embodiments and modifications may be appropriately combined.

According to the aspects of one or more embodiments described above, it is possible to provide a cable or a cable reinforcement sheet capable of suppressing cracking in the sheath.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST

1: Cable, 10: Object to be protected (cable main body), 20: Cable reinforcement sheet, 20a: First side edge, 20b: Second side edge, 21: First metal sheet, 21b: First point, 22: Second metal sheet, 22b: Second point, 30: Sheath, J: Joint portion, M: Reinforcement member

What is claimed is:
1. A cable that protects an object, comprising:
a sheath; and
a cylindrical reinforcement member disposed inside the sheath and that surrounds the object, wherein
the cylindrical reinforcement member has a first side edge and a second side edge that extend in a longitudinal direction,
the cylindrical reinforcement member is formed of a cable reinforcement sheet comprising:
a first metal sheet; and
a second metal sheet joined to the first metal sheet, wherein a portion of the first metal sheet overlaps a portion of the second metal sheet, and the overlapping portions define a joint portion where the first metal sheet and the second metal sheet are joined, the joint portion is inclined, from the second side edge to the first side edge, toward the first metal sheet, the joint portion has:
  a first point, on the first metal sheet along the first side edge, that is closest to a second metal sheet side of the joint portion; and
  a second point, on the second metal sheet along the second side edge, that is closest to a first metal sheet side of the joint portion, wherein
  the first point is closer to the first metal sheet side than is the second point, the first metal sheet includes a first edge placed at an end of the first metal sheet in a longitudinal direction, the second metal sheet includes a second edge placed at an end of the second metal sheet in the longitudinal direction, the first edge and the second edge define the joint portion, and a straight-line cutout portion extending from the first point is formed in the first metal sheet.

2. The cable according to claim 1, wherein the first side edge is disposed radially outside the second side edge.

3. The cable according to claim 1, wherein an angle formed by the first edge of the first metal sheet and the second side edge is 40° or more and 60° or less.

4. The cable according to claim 1, wherein
the first metal sheet and the second metal sheet are welded and fixed at the joint portion, and
S/W≥10.0, where
  S (mm²) is an area of the joint portion, and
  W (mm) is a width of the cable reinforcement sheet.

5. The cable according to claim 1, wherein the cable reinforcement sheet is rolled up in a width direction of the cable reinforcement sheet.

6. The cable according to claim 1, wherein the straight-line cutout portion is not parallel to the second edge.

7. A cable reinforcement sheet that protects an object by surrounding the object, comprising:
a first metal sheet; and
a second metal sheet joined to the first metal sheet, wherein
the cable reinforcement sheet has a first side edge and a second side edge that extend in a longitudinal direction,
a portion of the first metal sheet overlaps a portion of the second metal sheet, and the overlapping portions define a joint portion where the first metal sheet and the second metal sheet are joined,
the joint portion is inclined, from the second side edge to the first side edge, toward the first metal sheet,
the joint portion has:
  a first point, on the first metal sheet along the first side edge, that is closest to a second metal sheet side of the joint portion; and
  a second point, on the second metal sheet along the second side edge, that is closest to a first metal sheet side of the joint portion wherein
  the first point is closer to the first metal sheet side than is the second point, the first metal sheet includes a first edge placed at an end of the first metal sheet in a longitudinal direction,
the second metal sheet includes a second edge placed at an end of the second metal sheet in the longitudinal direction,
the first edge and the second edge define the joint portion, and
a straight-line cutout portion extending from the first point is formed in the first metal sheet.

8. A cable that protects an object, comprising:
a sheath; and
a cylindrical reinforcement member disposed inside the sheath and that surrounds the object, wherein
the cylindrical reinforcement member has a first side edge and a second side edge that extend in a longitudinal direction,
the cylindrical reinforcement member is formed of a cable reinforcement sheet comprising:
  a first metal sheet; and
  a second metal sheet joined to the first metal sheet, wherein
  a portion of the first metal sheet overlaps a portion of the second metal sheet, and the overlapping portions define a joint portion where the first metal sheet and the second metal sheet are joined,
the joint portion is inclined, from the second side edge to the first side edge, toward the first metal sheet,
the joint portion has:
  a first point, on the first metal sheet along the first side edge, that is closest to a second metal sheet side of the joint portion; and
  a second point, on the second metal sheet along the second side edge, that is closest to a first metal sheet side of the joint portion, wherein
  the first point is closer to the first metal sheet side than is the second point,
the first metal sheet includes a first edge placed at an end of the first metal sheet in a longitudinal direction,
the second metal sheet includes a second edge placed at an end of the second metal sheet in the longitudinal direction,
the first edge and the second edge define the joint portion,
a cutout portion extending from the first point is formed in the first metal sheet and is not parallel to the second edge.

9. The cable according to claim 8, wherein the first side edge is disposed radially outside the second side edge.

10. The cable according to claim 8, wherein an angle formed by the first edge of the first metal sheet and the second side edge is 40° or more and 60° or less.

11. The cable according to claim 8, wherein
the first metal sheet and the second metal sheet are welded and fixed at the joint portion, and
S/W≥10.0, where
  S (mm²) is an area of the joint portion, and
  W (mm) is a width of the cable reinforcement sheet.

12. The cable according to claim 8, wherein the cable reinforcement sheet is rolled up in a width direction of the cable reinforcement sheet.

* * * * *